United States Patent Office 3,428,650
Patented Feb. 18, 1969

3,428,650
2-(o-AMINOARYL)ISOINDOLES
William J. Houlihan, Mountain Lakes, N.J., assignor to Sandoz Inc., Hanover, N.J.
No Drawing. Filed July 21, 1966, Ser. No. 566,727
U.S. Cl. 260—326.1    3 Claims
Int. Cl. C07d 27/48; A61k 27/00

ABSTRACT OF THE DISCLOSURE

This invention relates to 2-(o-aminoaryl)isoindoles and to methods for preparing the same. The compounds of the invention are useful as anti-depressants, mild tranquilizers and hypotensive agents.

---

This invention relates to novel heterocyclic compounds. In particular, the invention pertains to 2-(o-aminoaryl) isoindoles and methods for preparing the same. The invention also relates to intermediates which are useful in preparing the above compounds and processes for preparing said intermediates.

The isoindoles of the present invention may be represented structurally as follows:

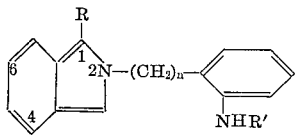

wherein
R represents phenyl or p-chlorophenyl;
n represents 0 or 1; and
R' represents hydrogen; or lower alkyl, preferably straight chain and containing from 1 to 4 carbon atoms, e.g., methyl, ethyl, propyl and butyl; provided that when n is 1, R' is other than hydrogen.

The isoindoles of Formula I wherein n is 0, i.e. where the o-aminophenyl substituent is directly bonded to the nitrogen of the isoindole ring, may be prepared by reacting an o-benzylbenzoic acid with an o-aminoaniline to form the corresponding isoindole - 5H - [1,2]benzimidazol - 11- one and then either reducing the latter directly to the desired 2-(o-aminophenyl)isoindole or first reducing the isoindolo-5H-[1,2-b]benzimidazol-11-one to form the corresponding isoindolo-5H-[1,2-b]benzimidazole which is then converted to the desired isoindole.

This process may be represented structurally as follows:

Reaction Sequence I

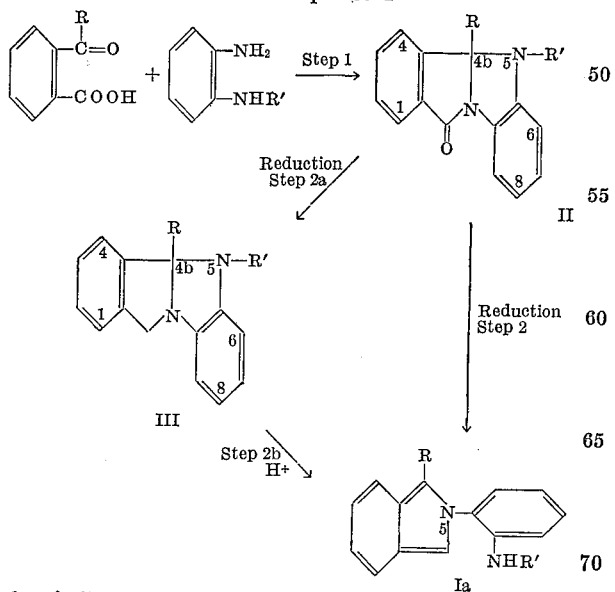

wherein R and R' are as previously defined.

The reaction of the o-acylbenzoic acid with the o-aminoaniline (Step 1) is conveniently carried out in an inert organic solvent, e.g., benzene, toluene, chlorobenzene, dioxane, cyclohexane, dimethylformamide, diethylformamide and pyridine, and at room temperature (20° C.) or elevated temperatures up to reflux temperature. Preferably the reaction is carried out at reflux temperature to facilitate continuous removal of water. To facilitate the formation of water the reaction may be carried out in the presence of a catalytic amount of hydrogen ions such as by the use of an arylsulfonic acid, e.g., benzene sulfonic acid, p-toluenesulfonic acid and the like.

The reduction (Step 2) of the isoindole-5H-[1,2-b] benzimidazol-11-one (II) to the desired 2-(o-aminophenyl)isoindole (Ia) is readily carried out in conventional manner employing a hydride reducing agent, preferably an aluminum hydride, such as lithium aluminum hydride, butyl aluminum hydride, triisobutyl aluminum hydride and the like. The reduction is conveniently effected in the presence of an inert organic solvent and at room temperature or elevated temperatures up to reflux temperature. Preferably the reaction is conducted at the reflux temperature of the system. Suitable solvents for the reaction include the ethers, such as diethyl ether, dibutyl ether and tetrahydrofuran. The resulting lithium complex is then decomposed in aqueous acidic medium. As indicated hereinabove, the conversion of the isoindole-5H-[1,2-b]benzimidazol - 11 - one (II) to the desired 2-(o-aminophenyl)isoindole (Ia) may be effected in two steps, whereby the intermediate benzimidazole (III) is first obtained (Step 2a) and then is converted (Step 2b) to the desired isoindole (Ia). The benzimidazole (III) is obtained by reduction of the isoindole-5H-[1,2-b]benzimidazol-11-one (Step 2a) in the same manner as described for Step 2 except that decomposition of the resulting lithium complex is effected in an aqueous basic medium. The resulting benzimidazole (III) is then readily converted to the desired indole (Ia) by acid hydrolysis.

The isoindoles of Formula I wherein n is 1, i.e., the 2-(o-aminobenzyl)isoindoles, are prepared by reacting an o-benzoylbenzoic acid with an o-aminobenzamide to form the corresponding 4a,5-10,12-tetrahydroisoindolo[1,2-b] quinazoline-10,12-dione and then reducing the latter. This process is illustrated by Reaction Sequence II below.

Reaction Sequence II

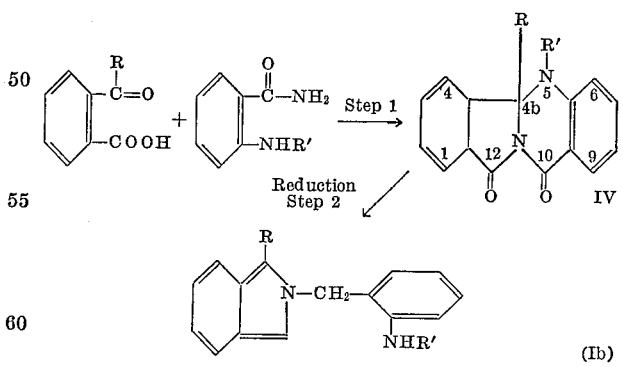

In the above formulae R and R' are as previously defined hereinabove except that R' is other than hydrogen.

Step 1 of the above reaction is carried out in the same manner as described for Step 1 of Reaction Sequence I. The reduction (Step 2) of the dione (IV) is effected in the same manner as described for Step 2a of Reaction Sequence I.

Various of the starting compounds employed in Step 1 of Reaction Sequences I and II are known and can be prepared as described in the literature. Such compounds which are not specifically disclosed in the literature may be prepared from available materials in analogous manner.

The compounds represented by Formula I are useful because they possess pharmacological activity. In particular, the compounds of Formula I wherein $n$ is 0 (Formula Ia) are central nervous system stimulants and can be used as anti-depressants while the compounds of Formula I wherein $n$ is 1 (Formula Ib) are central nervous system depressants and can be used as mild tranquilizers. The latter compounds also possess hypotensive activity. The intermediate compounds of Formula IV also possess pharmacological activity. These compounds are useful as hypotensive agents.

For the above uses, the compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspensions or emulsions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts, such as the hydrochloride, hydrobromide, sulfate, phosphate and the like and the organic acid salt, such as the benzoate, acetate, maleate, p-toluenesulfonate, benzenesulfonate and the like.

For the aforementioned uses the dosage administered will, of course, vary depending on the compound employed, the therapy desired and the mode of administration. In general, however, satisfactory results are obtained when administered at a daily dosage of from about 500 milligrams to about 1500 milligrams, preferably given in divided doses of from about 125 milligrams to about 750 milligrams throughout the day or in sustained release form.

Representative formulations suitable for oral administration are tablets prepared by standard tabletting techniques and containing the following:

| Ingredient | Parts by Weight | | |
|---|---|---|---|
| 1-phenyl-2-(o-aminophenyl)isoindole | 50 | | |
| 1-p-chlorophenyl-2-(o-methylaminobenzyl)isoindole | | 50 | |
| 4b-phenyl-5-methyl-4b,5,10,12-tetrahydroisoindolo-[1,2-b]quinazoline-10,12-dione | | | 50 |
| Tragacanth | 2 | 2 | 2 |
| Lactose | 39.5 | 39.5 | 39.5 |
| Corn Starch | 5 | 5 | 5 |
| Talcum | 3 | 3 | 3 |
| Magnesium Stearate | 0.5 | 0.5 | 0.5 |

The following examples show representative compounds contemplated by this invention and the manner in which such compounds are prepared. However, it is to be understood that these examples are intended for purposes of illustration only and are not intended as in any way limiting the scope of the invention which is defined in the appended claims.

Example 1.—1-phenyl-2-(o-aminophenyl)isoindole

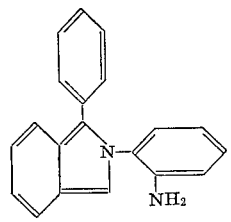

Step A) Preparation of 4b-phenyl-isoindolo-5H-[1,2-b]benzimidazol-11-one.—To a flask equipped with a stirrer and Dean-Stark tube is added 22.6 g. (0.10 mole) of o-benzoylbenzoic acid, 16.2 g. (0.15 mole) of o-phenylenediamine, 0.2 g. of p-toluenesulfonic acid and 350 ml. of toluene. The mixture is refluxed with stirring until water ceases to separate in the Dean-Stark tube. The solvent is then removed in vacuo on a rotary evaporator and the resulting oily residue added to methanol. The resulting yellow solid material is filtered off and recrystallized from ethanol-water to obtain 4b-phenyl-isoindolo-5H-[1,2-b]benzimidazol-11-one, M.P. 158° C.

(Step B) Preparation of 1 - phenyl-2-(o-aminophenyl) isoindole.—To a flask equipped with a stirrer, dropping funnel, condenser, gas inlet tube and Soxhlet tube containing 15.0 g. (0.05 mole) of 4b-phenyl-isoindolo-5H-[1,2-b]benzimidazol-11-one is added under a nitrogen atmosphere, 4.8 g. (0.13 mole) of lithium aluminum hydride and 500 ml. of anhydrous diethyl ether. The contents of the flask are then stirred and refluxed for 18 hours. The resulting mixture is then cooled in an ice bath and to the cooled mixture is added 9.6 ml. of 2 N sodium hydroxide and 14.4 ml. of water. The solvent is then removed in vacuo on a rotary evaporator to yield crude 4b-phenyl-4b, 11 - dihydroisoindole - 5H-[1,2-b]benzimidazole which is then chromatographed on a silica gel column. The resulting material is crystallized from methylene-chloride-pentane to yield 1-phenyl-2-(o-aminophenyl)isoindole, M.P. 139–142° C.

Example 2.—1-p-chlorophenyl-2-(o-methylaminobenzyl)isoindole

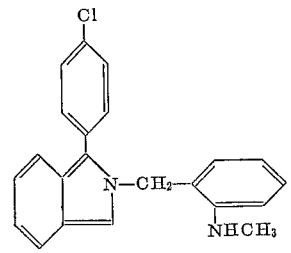

(Step A) Preparation of 4b-p-chlorophenyl-5-methyl-4b,5,10,12-tetrahydroisoindolo[1,2-b]quinazoline - 10,12-dione.—To a flask equipped with a stirrer and Dean-Stark tube is added 26.1 g. (0.1 mole) of 2-p-chlorobenzoylbenzoic acid, 22.5 g. (0.15 mole) of 2-methylaminobenzamide, 1.0 g. of p-toluenesulfonic acid and 300 ml. of dichlorobenzene. The mixture is refluxed with stirring until water ceases to separate in the Dean-Stark tube. The solvent is then removed in vacuo and the residue chromatographed on a silica gel column to obtain 4b-p-chlorophenyl - 5 - methyl - 4b,5,10,12 - tetrahydro-isoindolo[1,2-b]quinazoline-10,12-dione, M.P. 209–210° C.

(Step B) Preparation of 1-p-chlorophenyl-2-(o-methylaminobenzyl)isoindole.—To a flask equipped with a stirrer, dropping funnel, condenser, gas inlet tube and Sozhlet tube containing 10.0 g. (0.028 mole) of 4b-p-chlorophenyl - 5 - methyl - 4b,5,10,12 - tetrahydroisoindolo[1,2-b]quinazoline-10,12-dione is added, under a nitrogen atmosphere, 5.2 g. (0.14 mole) of lithium aluminum hydride and 500 ml. of absolute tetrahydrofuran. The contents of the flask are then stirred and refluxed for 60 hours. The resulting mixture is then cooled in an ice bath and to the cooled mixture is added 10.4 ml. of 2N sodium hydroxide and 15.6 ml. of water. The solvent is then removed in vacuo and the resulting oily residue extracted with pentane. The pentane extract is filtered and cooled to yield 1-p-chlorophenyl-2-(o-methylaminobenzyl)isoindole, M.P. 205–211° C.

Example 3.—1 - phenyl-2-(o-methylaminobenzyl)isoindole

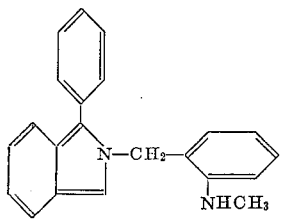

(Step A) Preparation of 4b-phenyl-5-methyl-4b,5,10,12-tetrahydroisoindolo[1,2-b]quinazoline-10,12 - dione.—To a flask equipped with a stirrer and Dean-Stark tube is added 4.5 g. (0.02 mole) of 2-benzoylbenzoic acid, 3.3 g. (0.022 mole) of 2-methyl-aminobenzamide, 0.5 g. of p-toluenesulfonic acid and 100 ml. of dichlorobenzene. The mixture is refluxed with stirring until water ceases to separate in the Dean-Stark tube. The solvent is then removed in vacuo on a rotary evaporator and the residue crystallized from methanol to obtain 4b - phenyl - 5 - methyl-4b,5,10,12 - tetrahydroisoquinolo[1,2 - b]quinazoline-10,12-dione, M.P. 223–225° C.

(Step B) Preparation of 1-phenyl-2-(o-methylaminobenzyl)isoindole.—Following the procedure of Step B of Example 2 and employing an equivalent amount of 4b-phenyl - 4 - methyl - 4b,5,10,12 - tetrahydroisoindolo[1,2-b]quinazoline-10,12-dione in place of the 4b - p - chlorophenyl - 5 - methyl - 4b,5,10,12-tetrahydroisoindolo[1,2-b]quinazoline-10,12-dione used therein, there is obtained 1-phenyl-2-(o-methylaminobenzyl)isoindole.

Example 4.—1-p-chlorophenyl-2-(o - aminophenyl)isoindole

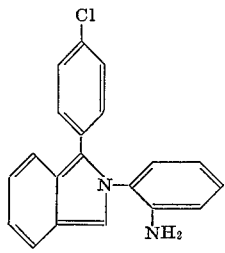

(Step A) Preparation of 4b-p-chlorophenyl-isoindolo-5H - [1,2 - b]benzimidazol-11-one.—To a flask equipped with a stirrer and Dean-Stark tube is added 52.2 g. (0.2 mole) of o-(p-chlorobenzoyl)benzoic acid, 32.4 g. (0.3 mole) of o-phenylenediamine, 1.5 g. of p-toluenesulfonic acid and 400 ml. of toluene. The mixture is refluxed with stirring until water ceases to separate in the Dean-Stark tube. The solvent is then removed in vacuo on a rotary evaporator and the residue chromatographed on a silica gel column to obtain 4b-p-chlorobenylisoindolo-5H-[1,2-b]benzimidazol-11-one, M.P. 162–163° C.

(Step B) Preparation of 4b-p-chlorophenyl-4b,11-dihydroisoindolo - 5H - [1,2-b]benzimidazole.—To a flask equipped with a stirrer, dropping funnel, condenser, gas inlet tube and Soxhlet tube containing 16.7 g. (0.05 mole) of 4b-p-chlorophenyl - isoindolo-5H-[1,2-b]benzimidazol-11-one is added under a nitrogen atmosphere, 4.8 g. (0.13 mole) of lithium aluminum hydride and 750 ml. of anhydrous diethyl ether. The contents of the flask are then stirred and refluxed for 48 hours. The resulting mixture is cooled in an ice bath and to the cooled mixture is added 9.6 ml. of 2 N sodium hydroxide and 14.4 ml. of water. The solvent is then remove in vacuo on a rotary evaporator to yield 4b-p-chlorophenyl-4b,11-dihydroisoindolo-5H-[1,2-b]benzimidazole as a brown solid with an indefinite melting point.

(Step C) Preparation of 1-p-chlorophenyl-2-(o-aminophenyl)isoindole.—The 4b-p-chlorophenyl-4b,11-dihydroisoindolo-5H-[1,2-b]-benzimidazole obtained in Step B is chromatographed on a silica gel column to obtain 1-p-chlorophenyl-2-(o-aminophenyl)isoindole.

What is claimed is:
1. A compound selected from the group consisting of isoindoles of the formula

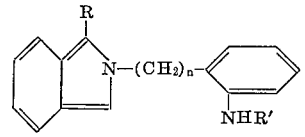

and non-toxic pharmaceutically acceptable acid addition salts thereof, wherein

R represents phenyl or p-chlorophenyl;
$n$ represents 0 or 1; and
R' represents hydrogen or lower alkyl; provided that when $n$ is 1, R' is other than hydrogen.

2. The compound of claim 1 which is 1-phenyl-2-(o-aminophenyl)-isoindole.

3. The compound of claim 1 which is 1-p-chlorophenyl-2-(o-methylaminobenzyl)isoindole.

References Cited

UNITED STATES PATENTS 3,031,458   4/1962   Huebner _____ 260—326.1

NICHOLAS S. RIZZO, Primary Examiner.

J. A. NARCAVAGE, Assistant Examiner.

U.S. Cl. X.R.

260—251, 309.2; 424—274